Aug. 8, 1967 — S. D. WILTSE — 3,334,929

TUBE COUPLING

Filed Oct. 1, 1965 — 2 Sheets-Sheet 1

INVENTOR.
SUMNER D. WILTSE
BY
*Whittemore, Hulbert & Belknap*
ATTORNEYS

Aug. 8, 1967  S. D. WILTSE  3,334,929
TUBE COUPLING
Filed Oct. 1, 1965  2 Sheets-Sheet 2
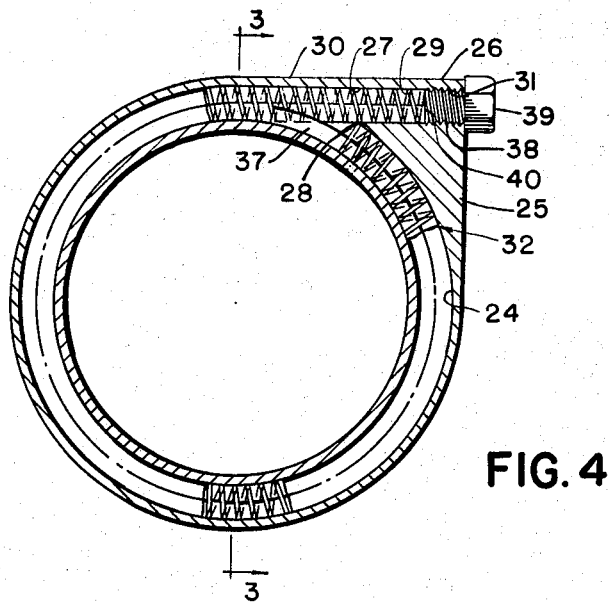
FIG. 4
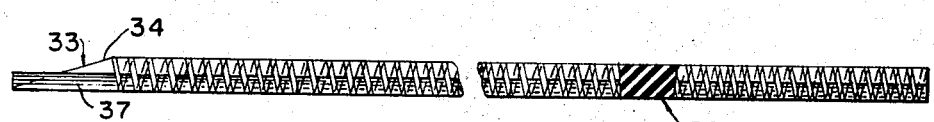
FIG. 5
FIG. 7  FIG. 6
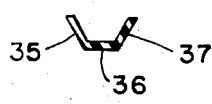
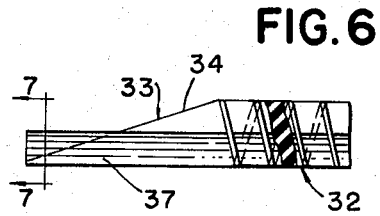
INVENTOR.
SUMNER D. WILTSE
BY
*Whittemore, Hulbert & Belknap*
ATTORNEYS

United States Patent Office 3,334,929
Patented Aug. 8, 1967

3,334,929
TUBE COUPLING
Sumner D. Wiltse, Detroit, Mich., assignor to Vibraseal Corporation, Detroit, Mich., a corporation of Michigan
Filed Oct. 1, 1965, Ser. No. 492,122
1 Claim. (Cl. 285—305)

ABSTRACT OF THE DISCLOSURE

A tube coupling having two tubular members provided with telescoping end portions having opposed channels providing a circumferentially extending passageway. An elongated body has a portion extending through an opening in the passageway in tangential relation thereto and extends lengthwise of the passageway. The elongated body has at its forward end a longitudinally extending tapered portion having at the rear thereof a single planar surface snugly engaging the underside of the tangential portion of the elongated body and having at the forward end thereof three sides snugly engaging the underside and opposite sides respectively of the tangential portion.

---

This invention relates generally to a coupling between two tubular members, and refers more particularly to means for connecting together two tubular members in telescoping relation with each other.

One of the essential objects of the invention is to provide two telescopically arranged tubular members having adjacent their free ends opposed circumferentially extending oppositely opening grooves or channels which cooperate with each other to provide a circumferentially extending passageway for the reception of a spring wire reinforced elongated body of rubber or rubber compound for retaining the telescoped members in operative assembled relation with each other.

Another object is to provide two telescopically arranged tubular members wherein each of the circumferentially extending grooves or channels therein is provided with three sides, and wherein adjacent sides thereof are disposed at substantially an obtuse angle to each other so that the opposed grooves or channels in the assembled tubular members cooperate with each other to provide a circumferentially extending passageway of hexagonal cross section.

Another object is to provide two telescopically arranged tubular members wherein the enlarged tubular end portion of the outermost tubular member is provided with a laterally projecting segmental enlargement having therethrough adjacent and substantially parallel to a substantially horizontal upper edge thereof a horizontal straight passageway registering with an opening in the periphery of and extending tangentially from the circumferentially extending passageway disposed between said telescoped tubular members.

Another object is to provide two telescopically arranged tubular members wherein the straight passageway has an intermediate portion of hexagonal cross section equal in cross section to the hexagonal cross section of the circumferentially extending passageway between said telescoped tubular members, has at the inner end of said intermediate portion an upper portion provided with three longitudinally extending sides wherein adjacent sides thereof are substantially at an obtuse angle to each other and constitute endwise extensions of the upper half of said intermediate portion, and has at its outer end an interiorly threaded portion.

Another object is to provide two telescopically arranged tubular members wherein the spring wire reinforced elongated body has throughout its length, except at its forward end, a hexagonal cross section substantially equal to the hexagonal cross section of the straight passageway and to the hexagonal cross section of the circumferentially extending passageway, and has at its forward end a longitudinally extending tapered portion provided for approximately one-half its length at the rear end thereof with a single planar surface and provided for the remainder of its length at the forward end thereof with three sides wherein adjacent sides thereof are disposed at substantially an obtuse angle to each other.

Another object is to provide two telescopically arranged tubular members wherein the spring wire reinforced elongated body is assembled with the two telescoped tubular members by inserting first the tapered forward end portion into the straight passageway and then pushing the spring wire reinforced elongated body lengthwise through the straight passageway and thence through the opening in the periphery of the circumferentially extending passageway disposed between said telescoped tubular members into and lengthwise of the circumferentially extending passageway until the single planar surface and the three sides of the tapered forward end portion of the spring wire reinforced elongated body engage the portion of the spring wire reinforced elongated body within the straight passageway.

Another object is to provide two telescopically arranged tubular members wherein a bolt having an exteriorly threaded shank threadedly engaging the interiorly threaded portion at the outer end of the straight passageway may be adjusted inwardly therein to apply pressure endwise against the rear end of the spring wire reinforced elongated body so that (1) the portion of the spring wire reinforced elongated body within the straight passageway will be forced snugly into fluid tight sealing engagement with the walls of the straight passageway, (2) the single planar surface and the three sides of the tapered forward end portion of the spring wire reinforced elongated body will be forced snugly into fluid tight sealing engagement with the portion of the spring wire reinforced elongated body within the straight passageway, and (3) the intermediate main portion of the spring wire reinforced elongated body will be forced snugly into fluid tight sealing engagement with the walls of the circumferentially extending passageway to pressure seal and retain the tubular members in assembled relation.

Another object is to provide a coupling of the type described that is simple in construction, economical to manufacture and efficient in operation.

Other objects, advantages and novel details of construction of this invention will be made more apparent as this description proceeds, especially when considered in connection with the accompanying drawings wherein:

FIGURE 4 is a vertical sectional view taken substantially on the line 4—4 of FIGURE 3.

FIGURE 5 is an elevational view of the spring wire reinforced elongated body of rubber or rubber compound.

FIGURE 6 is an enlarged fragmentary elevational view of the forward end portion of the spring wire reinforced elongated body of rubber or rubber compound.

FIGURE 7 is a vertical sectional view taken substantially on the line 7—7 of FIGURE 6.

Figure 1:
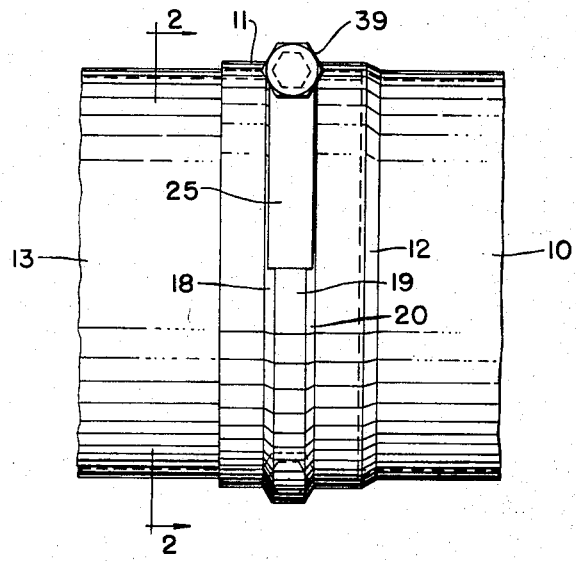
FIGURE 1 is a fragmentary side elevational view of a tube coupling embodying my invention.
Figure 2:
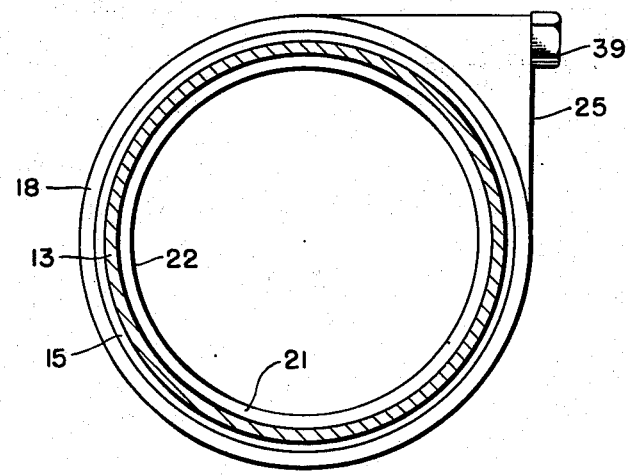
FIGURE 2 is a vertical sectional view taken substantially on the line 2—2 of FIGURE 1.
Figure 3:
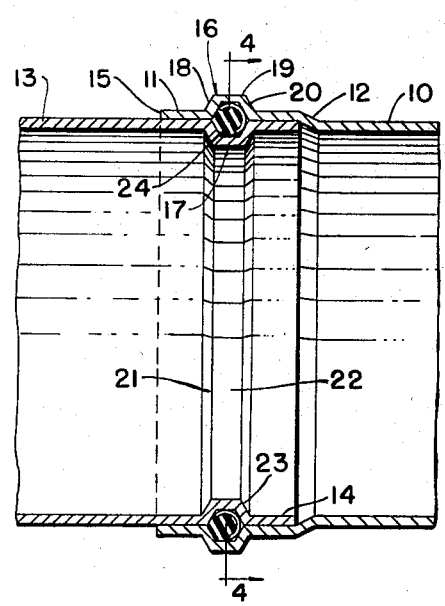
FIGURE 3 is a vertical sectional view taken substantially on the line 3—3 of FIGURE 4.

Referring now to the drawings, 10 is a tubular member having an enlarged tubular end portion 11 and having an inclined shoulder 12 at the juncture of said tubular member and said enlarged tubular end portion 11. 13 is a tubular member having a tubular end portion 14 disposed in telescoping relation within the enlarged tubular end portion 11 of the tubular member 10 and abutting the inclined shoulder 12.

As shown, the tubular end portions 11 and 14 respectively of the tubular members 10 and 13 are provided substantially midway between the inclined shoulder 12 and the free end 15 of the enlarged tubular end portion 11 with opposed circumferentially extending oppositely opening grooves or channels 16 and 17 respectively.

Preferably, the circumferentially extending groove or channel 16 in the end portion 11 of the tubular member 10 is provided with three sides 18, 19 and 20 respectively, and adjacent sides thereof are disposed at substantially an obtuse angle to each other. Likewise, the circumferentially extending groove or channel 17 in the end portion 14 of the tubular member 13 is provided with three sides 21, 22 and 23 respectively, and adjacent sides thereof are disposed at substantially an obtuse angle to each other. Thus when the tubular end portion 14 of the tubular member 13 is disposed in telescoping relation with the tubular end portion 11 of the tubular member 10, the grooves or channels 16 and 17 respectively cooperate with each other to provide a circumferentially extending passageway 24 of hexagonal cross section.

In the present instance, the enlarged tubular end portion 11 of the tubular member 10 is provided with a laterally projecting segmental enlargement 25 having therethrough adjacent and substantially parallel to a substantially horizontal upper edge 26 thereof, a horizontal straight passageway 27 registering with an opening 28 in the periphery of and extending tangentially from the circumferentially extending passageway 24 disposed between said telescoped tubular members 10 and 13.

Preferably the straight passageway 27 has an intermediate portion 29 of hexagonal cross section equal in cross section to the hexagonal cross section of the circumferentially extending passageway 24 between said telescoped tubular members, has at the inner end of said intermediate portion 29 an upper portion 30 provided with three longitudinally extending sides corresponding to and constituting endwise extensions of the upper half of said intermediate portion 29, and has at its outer end an interiorly threaded portion 31.

For sealing the telescoped tubular members 10 and 13 and for retaining them in operative assembled relation with each other I have provided a spring wire reinforced elongated body 32 of rubber or rubber compound having throughout its length, except at its forward end, a hexagonal cross section substantially equal to the hexagonal cross section of the straight passageway 27 and to the hexagonal cross section of the circumferentially extending passageway 24.

Such spring wire reinforced elongated body 32 has at its forward end a longitudinally extending tapered portion 33 provided for approximately one-half its length at the rear end thereof with a single planar surface 34, and provided for the remainder of its length at the forward end thereof with three sides 35, 36 and 37 respectively, wherein adjacent sides thereof are disposed at substantially an obtuse angle to each other.

Preferably the spring wire reinforced elongated body 32 is assembled with the two telescoped tubular members 10 and 13 by inserting first the tapered forward end portion 33 into the straight passageway 27 and then pushing the spring wire reinforced elongated body 32 lengthwise through the straight passageway 27 and thence through the opening 28 in the periphery of the circumferentially extending passageway 24 disposed between said telescoped tubular members into and lengthwise of the circumferentially extending passageway 24 until the single planar surface 34 at the rear end of the tapered end portion 33 of the spring wire reinforced elongated body 32 engages the underside of a portion of the spring wire reinforced elongated body 32 within the straight passageway 27 and the three sides 35, 36 and 37 respectively of the tapered end portion 33 of the spring wire reinforced elongated body 32 engage the underside and opposite sides respectively of the portion of the spring wire reinforced elongated body 32 within the straight passageway 27.

After the spring wire reinforced elongated body 32 has been assembled with the two telescoped tubular members 10 and 13, the exteriorly threaded shank 38 of a bolt 39 is threadedly engaged with the interiorly threaded portion 31 at the outer end of the straight passageway 27, and then is adjusted inwardly therein to apply pressure endwise against the rear end 40 of the spring wire reinforced elongated body 32 so that (1) the portion of the spring wire reinforced elongated body 32 within the straight passageway 27 will be forced snugly into fluid tight sealing engagement with the walls of the straight passageway 27, (2) the single planar surface 34 and the three sides 35, 36 and 37 respectively of the tapered forward end portion 33 of the spring wire reinforced elongated body 32 will be forced snugly into fluid tight sealing engagement with the portion of the spring wire reinforced elongated body 32 within the straight passageway 27, and (3) the intermediate main portion of the spring wire reinforced elongated body 32 will be forced snugly into fluid tight sealing engagement with the walls of the circumferentially extending passageway 24 to pressure seal and retain the tubular members 10 and 13 respectively in assembled telescoped relation.

What I claim as my invention is:

A tube coupling comprising a tubular member having an enlarged tubular end portion and having a shoulder at the juncture of said tubular member and said enlarged tubular end portion, a second tubular member having a tubular end portion disposed in telescoping relation within said enlarged tubular end portion and abutting said shoulder, said tubular end portions each being provided substantially midway between said shoulder and the free end of said enlarged portion with a circumferentially extending channel, said channels opening in opposite directions and cooperating to provide a circumferential passageway, said enlarged portion having a laterally projecting integral segmental enlargement, said enlargement having a straight passageway therethrough in tangential relation to and in communication with said circumferential passageway, a spring wire reinforced elongated elastic body having one end portion disposed in said straight passageway and the remaining portion extending substantially the length of said circumferential passageway, said passageways and said elastic body being hexagonal in cross-section, the other end of said elastic body having a longitudinally extending sloping planar surface joining the spaced outer and inner peripheral surfaces of the body, said planar surface being tangential to said circumferential passageway and in surface to surface engagement with said one end, said other end having relatively thin flanges extending from a point substantially midway of the ends of said sloping surface to the terminal end of said body, said flanges being extensions of two sides of the body and being disposed in obtuse angular relation to said sloping surface to thereby form a channel complementary to and underlapping the inner peripheral surface of said body, the flanges overlapping the two sides of said body adjacent said inner surface, and means in said straight passageway engaging said one end of said body and adjustable inwardly thereof to apply pressure inwardly against said one end.

References Cited

UNITED STATES PATENTS 2,458,714  1/1949  Mahoney _____ 285—305
3,218,095  11/1965  Wiltse _____ 285—318

FOREIGN PATENTS 1,243,193  8/1960  France.

CARL W. TOMLIN, *Primary Examiner.*

W. L. SHEDD, *Assistant Examiner.*